United States Patent [19]
Ferrett et al.

[11] Patent Number: 5,408,359
[45] Date of Patent: Apr. 18, 1995

[54] VISUAL SECURITY EYECUP

[75] Inventors: Donald A. Ferrett, Manassas; Lewis E. Lough, Woodbridge, both of Va.

[73] Assignee: The United States of America as represented by the Secretary of the Army, Washington, D.C.

[21] Appl. No.: 122,980

[22] Filed: Sep. 20, 1993

[51] Int. Cl.6 .............................. G02B 27/00
[52] U.S. Cl. ............................ 359/601; 359/39; 359/600; 359/611; 359/614; 359/228; 250/214 VT
[58] Field of Search ............ 359/600, 39, 228, 601, 359/611, 612, 614, 227, 229; 250/214 VT

[56] References Cited

U.S. PATENT DOCUMENTS

| | | | |
|---|---|---|---|
| 3,390,931 | 7/1968 | Luning et al. | 359/600 |
| 3,594,061 | 7/1971 | Selvage | 359/600 |
| 3,594,062 | 7/1971 | Disley | 359/600 |
| 4,601,540 | 7/1986 | Karning et al. | 359/600 |
| 5,153,760 | 10/1992 | Ahmed | 359/72 |
| 5,161,025 | 11/1992 | Nakao | 358/224 |

Primary Examiner—Georgia Y. Epps
Assistant Examiner—Michael Papalas
Attorney, Agent, or Firm—Milton W. Lee; John E. Holford; Anthony T. Lane

[57] ABSTRACT

A self contained protective shutter assembly for an imager eye piece including an eyecup, a powered shutter, switch, power supply and interface coupling.

9 Claims, 1 Drawing Sheet

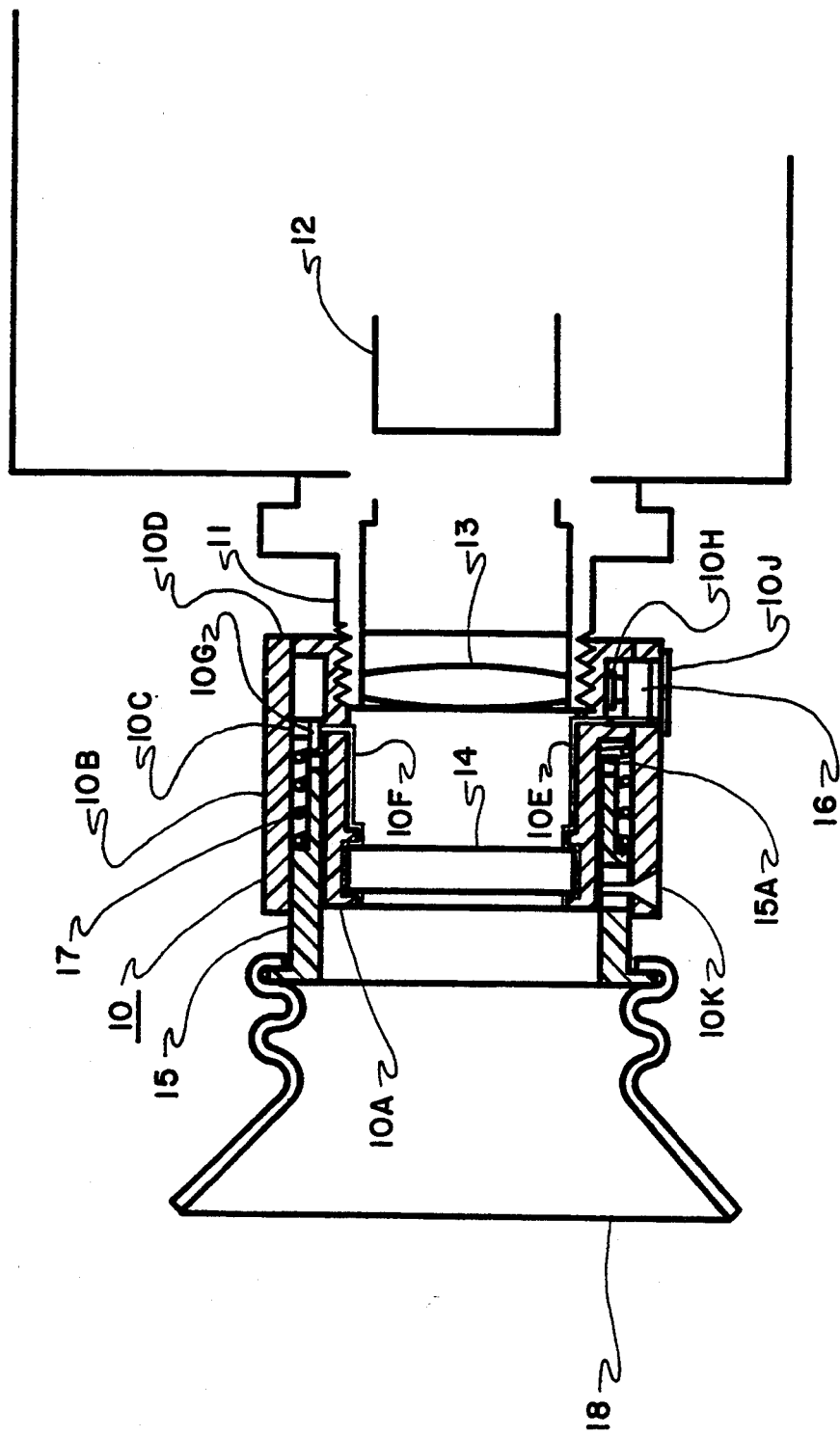

VISUAL SECURITY EYECUP

BACKGROUND OF THE INVENTION

1. Field of the Invention

The present invention generally relates to night vision devices, and more specifically, to individual crew served weapon sights with thermal imagers or image intensifiers.

2. Description of Prior Art

Night vision devices such as weapon sights, goggles, binoculars and observation telescopes use a variety of light enhancement schemes, which convert faint or invisible light images to electron images. The image intensifier type uses an electron multiplier tube to amplify the electron output of a photocathode. Uncooled thermal imagers utilize a light absorbing laminate including a layer of ferroelectric and/or pyroelectric material which stores static images. These become dynamic electronic images when scanned by electron beams or charge-coupled readout devices. Far-infrared devices normally utilize arrays of exotic cryogenic photodiodes, immersed in liquid nitrogen, over which the light image is scanned by vibrating mirrors or the like. A common denominator of all of the above schemes is a phosphor screen at the user end of the device where the electronic image is converted to a fairly intense visible light image.

This image is viewed through a hooded eyepiece, which prevents any stray light from striking the users face or nearby objects. Such illumination could easily be detected by enemy devices, particularly an image intensifier. This requires, however, that the user not turn on the device until his face is firmly against the eyepiece. Also, his face must not be removed until the device is turned off. To assure these requirements a special hooded device has been devised with a pressure sensitive switch to detect facial contact. An electrical interface between the eyepiece and the device must also be present to turn the latter on and off in accordance with the state of the pressure switch.

Unfortunately, all imagers do not have such an interface. On the other hand, some devices may have an interface, and may also require an adapter for the eyepiece that obviates the interface. A further problem with the above arrangement is that electronic failures can be related to unnecessary switching of image intensifiers and the like. Finally the provision of such an interface complicates structure of the device making it less reliable and more difficult to maintain.

SUMMARY OF THE INVENTION

According to the invention, the need for an electrical interface between an imaging device and the user's eyepiece is eliminated by placing a hooded shutter assembly in the eyepiece to prevent light leakage when the user's face is not pressed against it. An electronic shutter is used to provide greater reliability, maintainability, sensitivity and speed of operation. It is therefore one object of the invention to provide an imaging device with a hooded shutter assembly as a means to automatically prevent light leakage when the eyepiece when is not in use; the shutter requiring only a fixed mechanical coupling to the eyepiece.

It is another object of the invention to provide a hooded shutter assembly, as above, wherein the shutter is powered by a self contained battery.

It is a further object of the invention to provide a hooded shutter assembly, as above, wherein the shutter is a liquid crystal that electrically changes between transparent and opaque states.

BRIEF DESCRIPTION OF THE DRAWINGS

The foregoing and other objects, aspects and advantages will be better understood from the following detailed description of a preferred embodiment of the invention with reference to the drawing, which shows:

an axial cutaway view of the hooded shutter assembly.

DETAILED DESCRIPTION OF A PREFERRED EMBODIMENT OF THE INVENTION

Referring now to the drawing, the housing 10 for the hooded shutter assembly is shown connected to the eyepiece housing 11 of an imager, such as an infrared night sight. Such devices employ image intensifier tubes, HgCdTe photodiodes or other such sophisticated devices; which finally produce a visible image on a display 12. Usually the display is a fluorescent screen as in image intensifiers and far-infrared thermal imagers, but it could be any form of illuminated device that can be viewed at night. The screen is viewed through an eyepiece 13 that is adjusted to provide comfort to a variety of users. The eyepiece housing has external threads to engage hoods and other devices that may be desired by the user. Bayonet or other types of connecters are sometimes associated with this type of equipment.

The shutter 14 is enclosed in the assembly housing. The latter is preferably constructed with two coaxial cylindrical wall members. The planar disk shaped shutter is coaxially mounted in the inner wall member 10A, filling a cross section thereof, near its outer end. The shutter includes a pair of electrodes to which a potential difference must be applied. The shutter may be an electro-mechanical device many of which are well known in the art, but non-mechanical types such as LCD"s are preferred. For electrical purposes, the inner and outer wall members may be made from an insulating material, such as a high impact plastic. Alternatively, these members may be metal and one or both of the shutter electrodes and leads attached thereto may be placed and/or insulated so as not to contact the housing.

The outer housing member 10B is spaced from most of wall 10A by two annular ridges 10C and 10D, preferably defined by at least one the walls, to provide an open ended annular guide space for a hollow cylindrical plunger 15. The closed annular space between these ridges is used as a wiring conduit. A battery 16 is inserted into this conduit through a hole in the outer wall to fit flush or recessed with a cover 10J. The negative terminal of the battery contacts a resilient cathode lead 10E that also contacts one terminal of the shutter. An anode lead 10F connects the other terminal of the shutter to an anode pin contact 10G, which projects through ridge 10C into the closed and open annular spaces described above. The positive terminal of the battery contacts a resilient lead 10H, which connects it to at least one other anode pin, which are like cathode pin 10G, located at an angular displaced point in the annular conduit. Completion of the circuit between the anode and cathode pins is a function of the plunger 15. To this end the plunger may be made of conductive material or plastic with a conductive contact electrode 15A may be attached thereto on the edge that contacts the pins. The wall of the plunger is relieved over a portion of its radial thickness and axial extent to form a spring cage at its rear end adjacent the pins. A spring 17 is compressed in this cage to urge the plunger contact into a normally open state. The pins, plunger contact, spring and cage are dimensioned to prevent contact between the spring and electrodes in the open state. The pins can be closely spaced with a small plunger contact or up to 180° apart. A more stable arrangement might be to locate two anode pins 60° from the battery with a third pin, which may be electrically isolated, but is preferably wired to one of the other two, and located opposite the battery. The maximum reduction or change in axial length thus occurs when the plunger 15 contacts one of the anode pins 10G. No change in the shutter opacity occurs until two pins are contacted and opacity returns the instant contact is lost with one pin. The plunger is flanged on its front edge to receive a standard eyecup or hood 18. The unrelieved portion of the plunger wall, or the adjacent housing wall, defines at least one radial slot having a preselected axial length. A set screw 10K threaded into at least one adjacent wall extends into or through this slot. This slot length is kept short, e.g. less than ⅛ inch, to provide quick operation, but long enough to reliably disconnect the switch contacts. The spring provides sufficient force to reject brush contacts with the eyepiece, but is compliant enough to permit plunger travel before the eyecup is completely deformed. While this invention has been described in terms of a preferred embodiment consisting of specific imagers and shutters, those skilled in the art will recognize that the invention can be practiced with modification within the spirit and scope of the appended claims.

Having thus described my invention, what I claim as new and desire to secure by Letters Patent is as follows:

1. An hooded shutter assembly for the user of an optical imager with an integral eyepiece housing opening into said imager at a first end thereof adjacent to an electronic source of visible light in said imager; said housing having an accessory coupling means attached to an opposite open end thereof to engage a mated light-tight coupling on said hooded assembly; comprising:

a single pole, single throw, momentary, normally-off switch assembly, said assembly including;
   light-tight inner wall and outer plunger housing tubes with substantially equal lengths, stepped thicknesses, and similar cross-sections, said tubes being telescoped with protruding and non-protruding inner and outer ends, respectively;
   detent means mounted between said tubes to limit the maximum and minimum overlapped length thereof to substantially different values greater than half the length of one of said tubes;
   each of said tubes providing at least one of a plurality of switch contacts, at least a selected one of which is electrically isolated from the rest, said contacts being shaped and positioned to abut with said selected contact only when said overlapped length substantially equals said maximum value;
   a compressible helical return spring means coaxially inserted between said tubes biasing them into said maximum overlapped length, and
   said light-tight mated coupling being coaxially formed on said inner protruding end;
   a compliant conical eyecup having a small axial end thereof tightly surrounding said outer end of said switch assembly and a large axial end adapted to engage the facial tissue covering the eye orbit of said user;
   an electrical storage battery mounted in said switch assembly;
   a normally opaque electrically operated planar shutter, mounted in said inner housing tube and occupying an inner cross-section in all unobstructed paths for visible light passing therethrough, said shutter being substantially transparent to visible light only when electrically connected to said source;
   said switch assembly, said source and said shutter means being electrically coupled in series only, such that said shutter is transparent only when a pressure condition is imposed on said eyecup which causes said maximum value of overlapped length in said switch assembly.

2. A shutter assembly according to claim 1, wherein:
   said shutter is a sheet of material having spaced edge electrodes thereon and an opacity between said electrodes that varies with electric potentials applied between said electrodes.

3. A shutter assembly according to claim 2, wherein said sheet includes:
   a liquid crystal interconnecting said electrodes.

4. A shutter assembly according to claim 1, wherein:
   said inner protruding end includes two spaced external coaxial ridges of equal diameters and a height slightly less than the maximum thickness of said plunger tube;
   a housing cover tube equal in length to said inner wall tube and equal in inner diameter to the largest diameter of said ridges coaxially mounted over the full length of said inner tube and affixed to said ridges; and
   said battery is a disk-shaped element inserted with a diameter between said ridges in a recess partially formed by a hole in said cover tube slightly larger in diameter than said disk.

5. A shutter assembly according to claim 4, wherein:
   said plunger tube has a thickness at said protruding outer end slightly less than said height of said ridges and a reduced thickness due, to a step in only one of the inner and outer walls thereof, extending from the opposite end for less than half said tube length;
   said spring lying in the recess defined by said step in said plunger wall, the nearest wall of said inner tube and cover, and the nearest of said ridges.

6. A shutter assembly according to claim 1, wherein:
   said plunger tube is one of said switch contacts.

7. A shutter assembly according to claim 6, wherein:
   wherein said plunger tube is made of plastic and said contact is plated on said non-protruding end thereof.

8. A shutter assembly according to claim 4, wherein:
   at least one of said switch contacts is a embedded in the outer wall of said inner tube projecting into the space between said inner tube and said cover.

9. A shutter assembly according to claim 1, wherein said accessory coupling means comprises a cylindrical portion of said eyepiece housing with a standard set of threads formed in the outer surface thereof further including:
   the protruding portion of said inside tube having an inner diameter and a set of accessary threads on the inner surface thereof that mate with said standard set.

* * * * *